US008856321B2

(12) United States Patent
Iyengar et al.

(10) Patent No.: US 8,856,321 B2
(45) Date of Patent: Oct. 7, 2014

(54) SYSTEM TO IMPROVE OPERATION OF A DATA CENTER WITH HETEROGENEOUS COMPUTING CLOUDS

(75) Inventors: Madhusudan K. Iyengar, Woodstock, NY (US); Vinod Kamath, Raleigh, NC (US); Eren Kursun, Ossining, NY (US); Roger R. Schmidt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 13/077,578

(22) Filed: Mar. 31, 2011

(65) Prior Publication Data
US 2012/0254400 A1    Oct. 4, 2012

(51) Int. Cl.
G06F 15/16    (2006.01)
G06F 15/173    (2006.01)
G06F 9/50    (2006.01)

(52) U.S. Cl.
CPC .................................. G06F 9/5094 (2013.01)
USPC ........... 709/224; 709/201; 709/217; 709/218; 709/219; 709/223; 709/226; 709/229

(58) Field of Classification Search
USPC .......... 709/201, 217–219, 223–224, 226, 229
See application file for complete search history.

(56) References Cited

U.S. PATENT DOCUMENTS

| | | | |
|---|---|---|---|
| 7,860,973 B2* | 12/2010 | Gauthier et al. | 709/226 |
| 7,975,165 B2* | 7/2011 | Shneorson et al. | 714/3 |
| 8,335,859 B2* | 12/2012 | Nagpal et al. | 709/238 |
| 8,352,085 B2* | 1/2013 | Marwah et al. | 700/277 |
| 8,407,413 B1* | 3/2013 | Yucel et al. | 711/108 |
| 8,407,501 B2* | 3/2013 | Agarwala et al. | 713/320 |
| 8,411,440 B2* | 4/2013 | Dunwoody et al. | 361/699 |
| 8,417,938 B1* | 4/2013 | Considine et al. | 713/151 |
| 8,429,630 B2* | 4/2013 | Nickolov et al. | 717/148 |
| 8,479,215 B2* | 7/2013 | Lakshmanan et al. | 718/105 |
| 8,527,997 B2* | 9/2013 | Bell et al. | 718/102 |
| 8,566,447 B2* | 10/2013 | Cohen et al. | 709/226 |
| 8,655,610 B2* | 2/2014 | Dasgupta et al. | 702/61 |
| 2004/0131059 A1* | 7/2004 | Ayyakad et al. | 370/389 |
| 2008/0080718 A1 | 4/2008 | Meijer et al. | 380/282 |
| 2010/0061250 A1 | 3/2010 | Nugent | 370/242 |

(Continued)

OTHER PUBLICATIONS

Buyya, Rajkumar, Anton Beloglazov, and Jemal Abawajy. "Energy-efficient management of data center resources for cloud computing: A vision, architectural elements, and open challenges." arXiv preprint arXiv:1006.0308 (2010).*

(Continued)

*Primary Examiner* — Thomas Dailey
*Assistant Examiner* — Angela Widhalm
(74) *Attorney, Agent, or Firm* — Margaret A. McNamara; Ido Tuchman

(57) ABSTRACT

A system to improve operation of a data center with heterogeneous computing clouds may include monitoring components to track data center climate controls and individual heterogeneous computing clouds' operating parameters within the data center. The system may also include a controller that regulates the individual heterogeneous computing clouds and data center climate controls based upon data generated by the monitoring components to improve the operating performance of the individual heterogeneous computing clouds as well as the operating performance of the data center. The system may further include spilling computing clouds to receive excess workload of an individual heterogeneous computing cloud without violating individual heterogeneous computing clouds contracts.

19 Claims, 15 Drawing Sheets

(56) References Cited

U.S. PATENT DOCUMENTS

| | | | |
|---|---|---|---|
| 2010/0076933 A1* | 3/2010 | Hamilton et al. ............. | 707/640 |
| 2010/0318454 A1* | 12/2010 | Warncke et al. ................ | 705/37 |
| 2010/0332373 A1* | 12/2010 | Crabtree et al. ................ | 705/37 |
| 2011/0016214 A1* | 1/2011 | Jackson ........................ | 709/226 |
| 2011/0022812 A1* | 1/2011 | van der Linden et al. .... | 711/163 |
| 2011/0103391 A1* | 5/2011 | Davis et al. ................... | 370/400 |
| 2012/0016778 A1* | 1/2012 | Salle et al. ................... | 705/27.1 |
| 2012/0110185 A1* | 5/2012 | Ganesan et al. .............. | 709/226 |
| 2012/0166616 A1* | 6/2012 | Meehan et al. ............... | 709/224 |
| 2012/0166645 A1* | 6/2012 | Boldyrev et al. ............. | 709/226 |
| 2012/0180055 A1* | 7/2012 | Brech et al. ................... | 718/102 |
| 2012/0216200 A1* | 8/2012 | Vaidyanathan et al. ...... | 718/100 |
| 2013/0066477 A1* | 3/2013 | Jiang ............................. | 700/291 |
| 2013/0246922 A1* | 9/2013 | Doerr et al. ................... | 715/735 |

OTHER PUBLICATIONS

Beloglazov, Anton, and Rajkumar Buyya. "Energy efficient resource management in virtualized cloud data centers." Proceedings of the 2010 10th IEEE/ACM International Conference on Cluster, Cloud and Grid Computing. IEEE Computer Society, 2010.*

Berl, Andreas, et al. "Energy-efficient cloud computing." The Computer Journal 53.7 (2010): 1045-1051.*

Al-Fares, Mohammad, et al. "Hedera: Dynamic Flow Scheduling for Data Center Networks." NSDI. vol. 10. 2010.*

Wang, Lizhe, et al. "Towards thermal aware workload scheduling in a data center." Pervasive Systems, Algorithms, and Networks (ISPAN), 2009 10th International Symposium on. IEEE, 2009.*

William Fellows, "CloudSwitch connects datacenters out to clouds" 451-Group Cloud Switch (Fellows) (2010).

Oracle, "Bridging the Divide between SaaS and Enterprise Datacenters" An Oracle White Paper (2010).

Ted Alford et al., "Economics of Cloud Computing" BAH-024 White Paper, www.boozallen.com (2009).

Anton Beloglazov et al., "Energy Efficient Resource Management in Virtualized Cloud Data Centers" 2010 10th IEEE/ACM International Conference on Cluster, Cloud and Grid Computing, pp. 826-831 (2010).

* cited by examiner

SYSTEM TO IMPROVE OPERATION OF A DATA CENTER WITH HETEROGENEOUS COMPUTING CLOUDS

BACKGROUND

The invention relates to the field of computer systems, and, more particularly, to heterogeneous computing clouds.

Cloud computing is an emerging computing service that has been successfully implemented in world wide web applications by various vendors. Various hardware resources, usually at the granularity of individual servers, are contracted to clients in a cloud computing setting. Since the contracts are short term with no dedicated machine agreements, the data center management algorithms can easily migrate the workload from region to region in such settings. The thermal variation of such is also relatively small since the application mix has smaller variation.

SUMMARY

According to one embodiment of the invention, a system to improve operation of a data center with heterogeneous computing clouds may include monitoring components to track data center climate controls, the data center operating parameters, and individual heterogeneous computing clouds' operating parameters within the data center. The system may also include a controller that regulates the individual heterogeneous computing clouds and data center climate controls based upon data generated by the monitoring components to improve the operating performance of the individual heterogeneous computing clouds as well as the operating performance of the data center. The system may further include spilling computing clouds to receive excess workload of an individual heterogeneous computing cloud without violating individual heterogeneous computing clouds contracts.

The system may further include secure and fast interconnect between the individual computing clouds and the spilling clouds for data transmission.

At least some of the individual heterogeneous computing clouds may include dedicated hardware that is assigned to one client only. The individual heterogeneous computing clouds with dedicated hardware may exhibit particular application profiles and/or particular temperature profiles that differ from other individual heterogeneous computing clouds in the same data center.

The system may additionally include spilling computing clouds to receive excess workload of an individual heterogeneous computing cloud without violating individual heterogeneous computing clouds contracts. The spilling computing clouds may activate when a threshold based upon temperature, resource demand, and/or wear-out characteristics of the hardware is expected to be exceeded. If the performance, energy and wear-out characteristics are improved the spilling computing clouds may be activated as an efficiency enabler even when the thresholds are not exceeded.

The controller may model the individual heterogeneous computing clouds and/or the data center to determine spilling computing cloud activation thresholds and/or data center state thresholds. The controller may regulate sharing of spilling computing clouds resources between individual heterogeneous computing clouds.

At least some of the individual heterogeneous computing clouds may include hardware variations from the other individual heterogeneous computing clouds. The hardware variations may be based upon customization for particular client needs.

Another aspect of the invention is a method to improve operation of a data center with heterogeneous computing clouds and/or the heterogeneous computing clouds that may include tracking individual heterogeneous computing clouds' operating parameters within a data center, the data center operating parameters, and data center climate controls. The method may also include regulating the individual heterogeneous computing clouds and data center climate controls, via a controller, based upon data generated by monitoring components to improve operating performance of the individual heterogeneous computing clouds as well as operating performance of the data center. The method may further include sending to spilling computing clouds excess workload of an individual heterogeneous computing cloud without violating individual heterogeneous computing clouds contracts.

The method may further include assigning at least some of the individual heterogeneous computing clouds dedicated hardware that is assigned to one client only, e.g. heterogeneous enterprise clouds, and where the individual heterogeneous computing clouds with dedicated hardware exhibit particular application profiles and/or particular temperature profiles that differ from other individual heterogeneous computing clouds in the same data center. The method may additionally include sending excess workload of one individual heterogeneous computing cloud to a spilling computing cloud, e.g. a specially marked region of computing hardware that is utilized for dynamic load fluctuations, without violating other individual heterogeneous computing clouds' contracts, and the controller regulating sharing of spilling computing clouds resources between other individual heterogeneous computing clouds.

The method may also include activating the spilling computing cloud when a threshold based upon temperature, resource demand, and/or wear-out characteristics of individual heterogeneous computing cloud is expected to be exceeded. The method may further include determining spilling computing cloud activation thresholds and/or data center state thresholds. The method may additionally comprise including hardware variations based upon customization for particular client needs for at least some of the individual heterogeneous computing clouds that differ from the other individual heterogeneous computing clouds.

Another aspect of the invention is computer readable program codes coupled to tangible media to improve operation of a data center with heterogeneous computing clouds and/or the heterogeneous computing clouds. The computer readable program codes may be configured to cause the program to track individual heterogeneous computing clouds' operating parameters within a data center, the data center operating parameters, and data center climate controls. The computer readable program codes may also regulate the individual heterogeneous computing clouds, e.g. different enterprise computing clouds, and data center climate controls, via a controller, based upon data generated by monitoring components to improve operating performance of the individual heterogeneous computing clouds as well as operating performance of the data center. The computer readable program codes may also send to spilling computing clouds excess workload of an individual heterogeneous computing cloud without violating individual heterogeneous computing clouds contracts.

The computer readable program codes may further assign at least some of the individual heterogeneous computing clouds dedicated hardware that is assigned to one client only, and the individual heterogeneous computing clouds with dedicated hardware exhibit particular application profiles and/or particular temperature profiles that differ from other individual heterogeneous computing clouds in the same data center. The computer readable program codes may additionally send excess workload of one individual heterogeneous computing cloud to a spilling computing cloud without violating other individual heterogeneous computing clouds' contracts, and the controller regulates sharing of spilling computing clouds resources between other individual heterogeneous computing clouds.

The computer readable program codes may also activate the spilling computing cloud when a threshold based upon temperature, resource demand, and/or wear-out characteristics of individual heterogeneous computing cloud is expected to be exceeded. The computer readable program codes may further determine spilling computing cloud activation thresholds and/or data center state thresholds.

DETAILED DESCRIPTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

Figure 1:
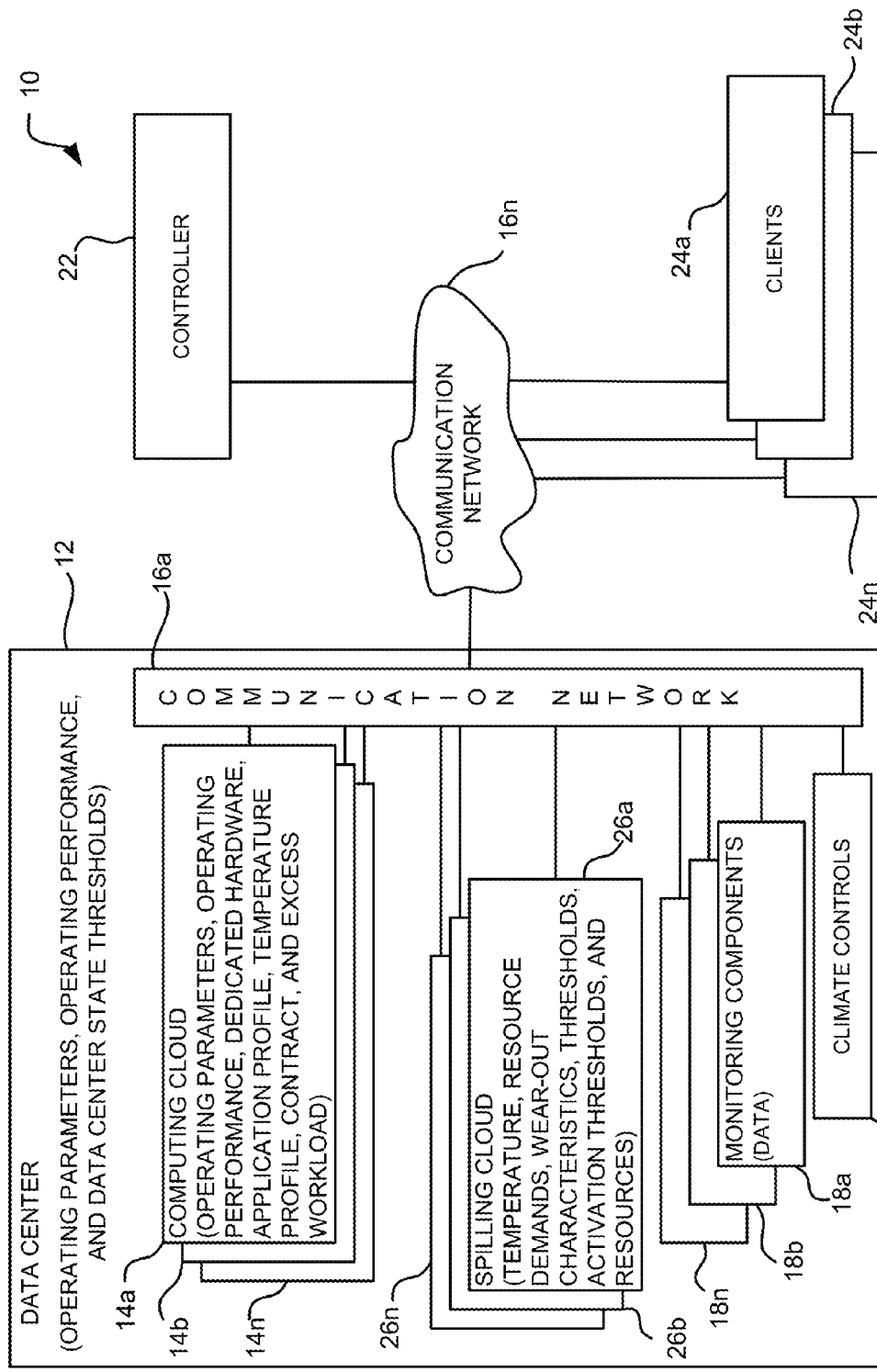
FIG. 1 is a block diagram illustrating a system to improve operation of a data center with heterogeneous computing clouds and/or the heterogeneous computing clouds in accordance with the invention.

With reference now to FIG. 1, a system 10 to improve operation of a data center 12 with heterogeneous computing clouds 14a-14n and/or the heterogeneous computing clouds is initially described. The data center 12 includes a communications network 16a-16n that connects the various components within and/or outside the data center 12 with each other as will be appreciated by those of skill in the art. In an embodiment, the system 10 includes monitoring components 18a-18n to track data center climate controls 20 and individual heterogeneous computing clouds' operating parameters within the data center 12. In one embodiment, the system 10 also includes a controller 22 that regulates the individual heterogeneous computing clouds 14a-14n and data center climate controls 20 based upon data generated by the monitoring components 18a-18n to improve the operating performance of the individual heterogeneous computing clouds as well as the operating performance of the data center 12. The controller 22 is located inside and/or outside of the data center 12.

In an embodiment, at least some of the individual heterogeneous computing clouds 14a-14n include dedicated hardware that is assigned to one client 24a-24n only. In one embodiment, the individual heterogeneous computing clouds 14a-14n with dedicated hardware exhibit particular application profiles and/or particular temperature profiles that differ from other individual heterogeneous computing clouds in the same data center 12.

In an embodiment, the system 10 additionally includes spilling computing clouds 26a-26n to receive excess workload of an individual heterogeneous computing cloud 14a-14n without violating individual heterogeneous computing clouds contracts. In one embodiment, there is secure interconnect infrastructure among an individual heterogeneous cloud 14a-14n and spilling cloud 26a-26n for data transmission.

In an embodiment, system 10 comprises a global controller that interacts with the dedicated controllers to improve the operating performance of the data center 12 within security constraints. In one embodiment, the spilling computing clouds 26a-26n activate when a threshold based upon temperature, resource demand, and/or wear-out characteristics of the hardware is expected to be exceeded.

In an embodiment, the controller 22 models the individual heterogeneous computing clouds 14a-14n and/or data center 12 to determine spilling computing cloud 26a-26n activation thresholds and/or data center state thresholds. In one embodiment, the controller 22 regulates the sharing of spilling computing clouds 26a-26n resources between individual heterogeneous computing clouds 14a-14n.

In an embodiment, at least some of the individual heterogeneous computing clouds 14a-14n include hardware variations from the other individual heterogeneous computing clouds. In one embodiment, the hardware variations are based upon customization for particular client's 24a-24n needs.

Figure 2:
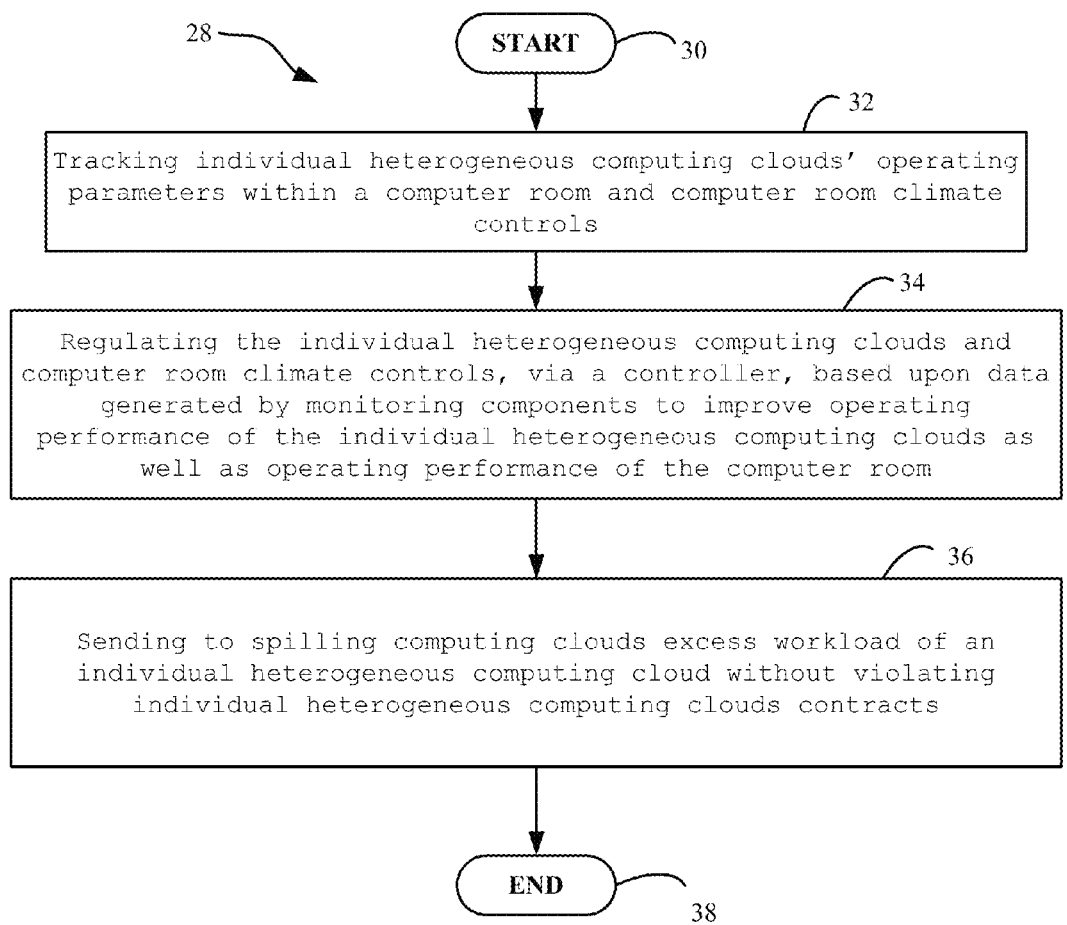
FIG. 2 is a flowchart illustrating method aspects according to the invention.

Another aspect of the invention is a method to improve the operation of a data center with heterogeneous computing clouds and/or the heterogeneous computing clouds, which is now described with reference to flowchart 28 of FIG. 2. The method begins at Block 30 and may include tracking individual heterogeneous computing clouds' operating parameters within a data center and data center climate controls at Block 32. The method may also include regulating the individual heterogeneous computing clouds and data center climate controls, via a controller, based upon data generated by monitoring components to improve operating performance of the individual heterogeneous computing clouds as well as operating performance of the data center at Block 34. The method further include sending to spilling computing clouds excess workload of an individual heterogeneous computing cloud without violating individual heterogeneous computing clouds contracts at Block 36. The method ends at Block 38.

Figure 3:
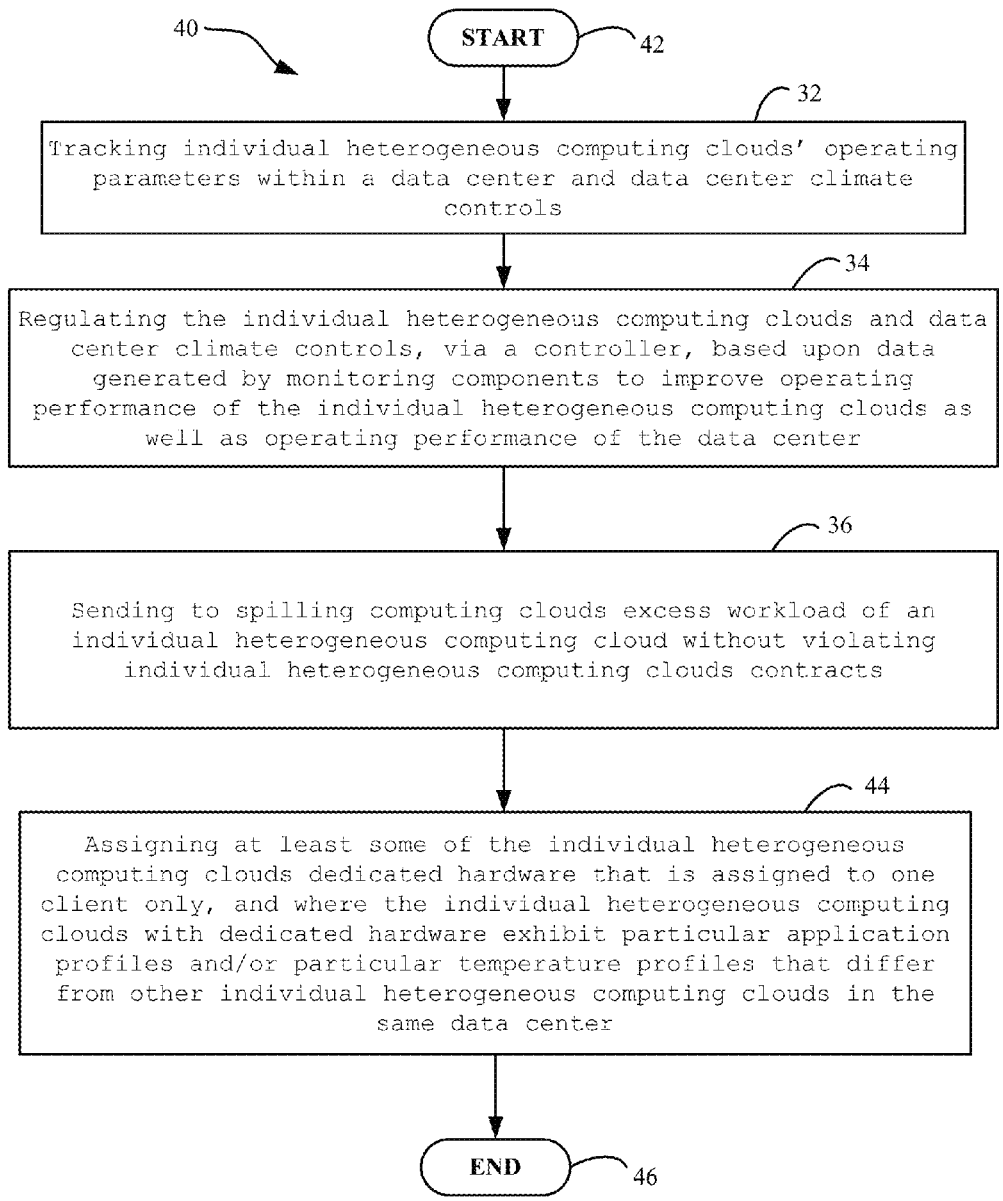
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 32, 34, and 36. The method may further include assigning at least some of the individual heterogeneous computing clouds dedicated hardware that is assigned to one client only, and where the individual heterogeneous computing clouds with dedicated hardware exhibit particular application profiles and/or particular temperature profiles that differ from other individual heterogeneous computing clouds in the same data center at Block 44. The method ends at Block 46.

Figure 4:
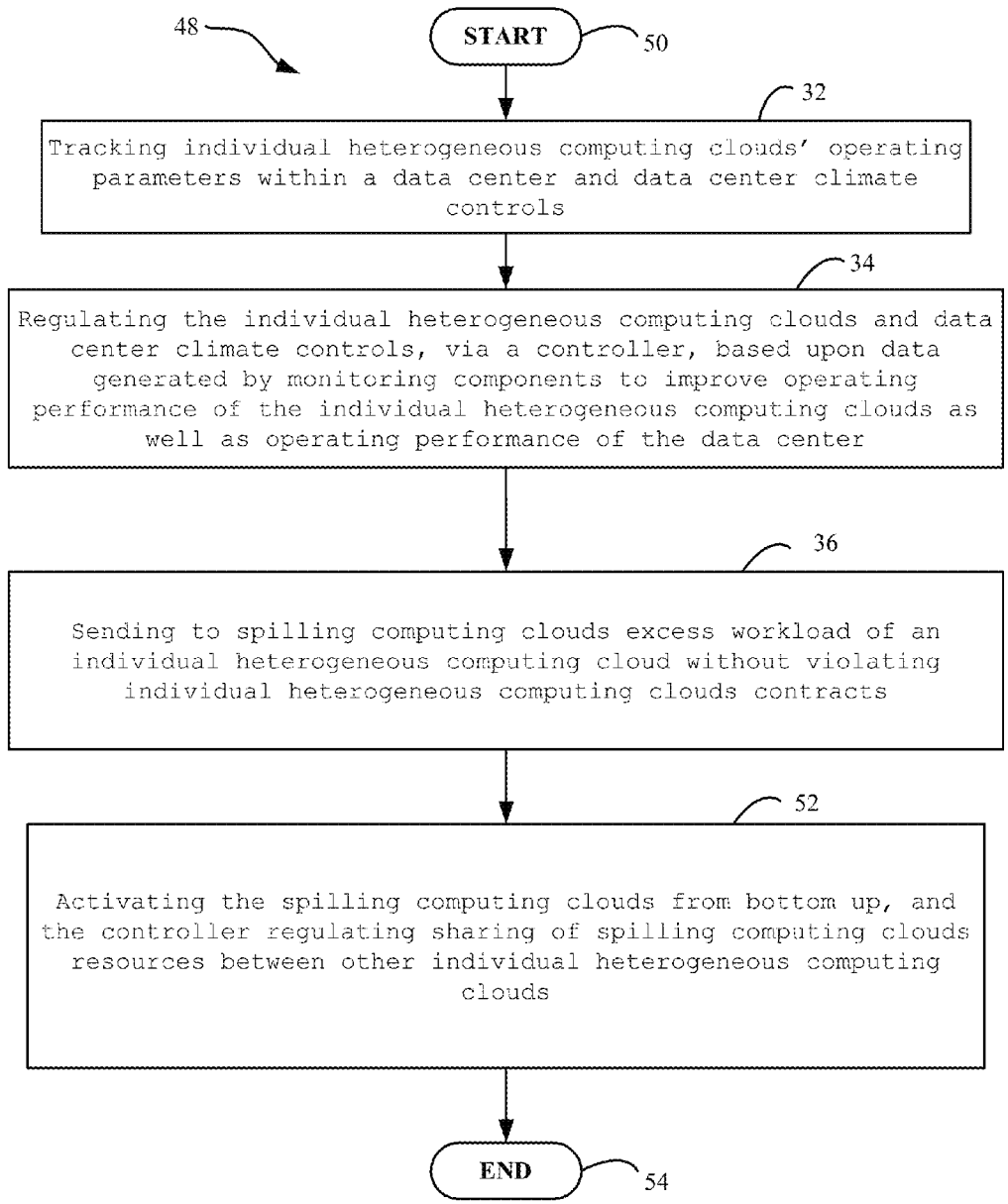
FIG. 4 is a flowchart illustrating method aspects according to the method of FIG. 2.

In another method embodiment, which is now described with reference to flowchart 48 of FIG. 4, the method begins at Block 50. The method may include the steps of FIG. 2 at Blocks 32, 34, and 36. The method may further include activating the spilling computing clouds from bottom up, and the controller regulating sharing of spilling computing clouds resources between other individual heterogeneous computing clouds at Block 52. The method ends at Block 54.

Figure 5:
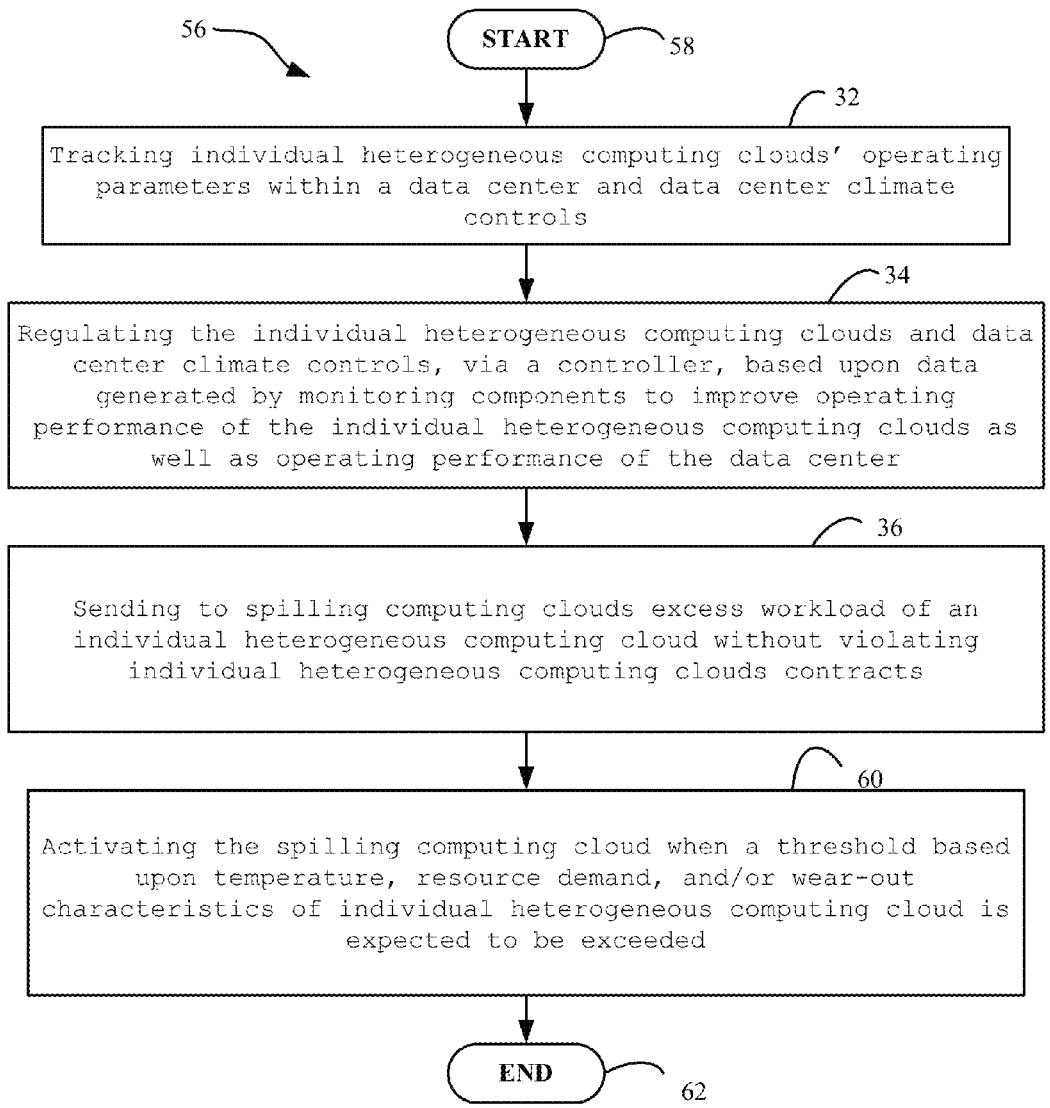
FIG. 5 is a flowchart illustrating method aspects according to the method of FIG. 2.

In another method embodiment, which is now described with reference to flowchart 56 of FIG. 5, the method begins at Block 58. The method may include the steps of FIG. 2 at Blocks 32, 34, and 36. The method may further include activating the spilling computing cloud when a threshold based upon temperature, resource demand, and/or wear-out characteristics of individual heterogeneous computing cloud is expected to be exceeded at Block 60. The method ends at Block 62.

Figure 6:
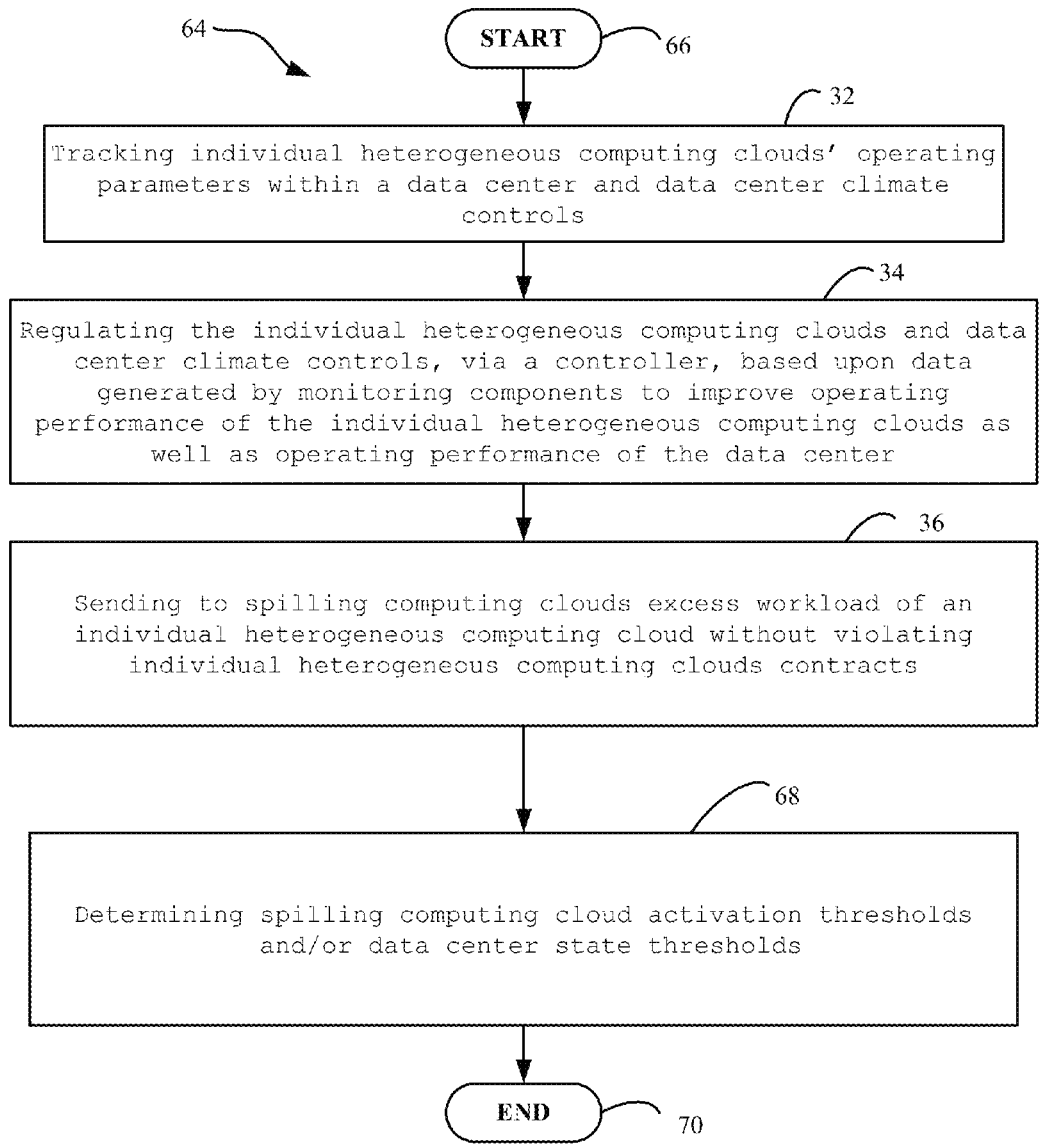
FIG. 6 is a flowchart illustrating method aspects according to the method of FIG. 2.

In another method embodiment, which is now described with reference to flowchart 64 of FIG. 6, the method begins at Block 66. The method may include the steps of FIG. 2 at Blocks 32, 34, and 36. The method may further include determining spilling computing cloud activation thresholds and/or data center state thresholds at Block 68. The method ends at Block 70.

Figure 7:
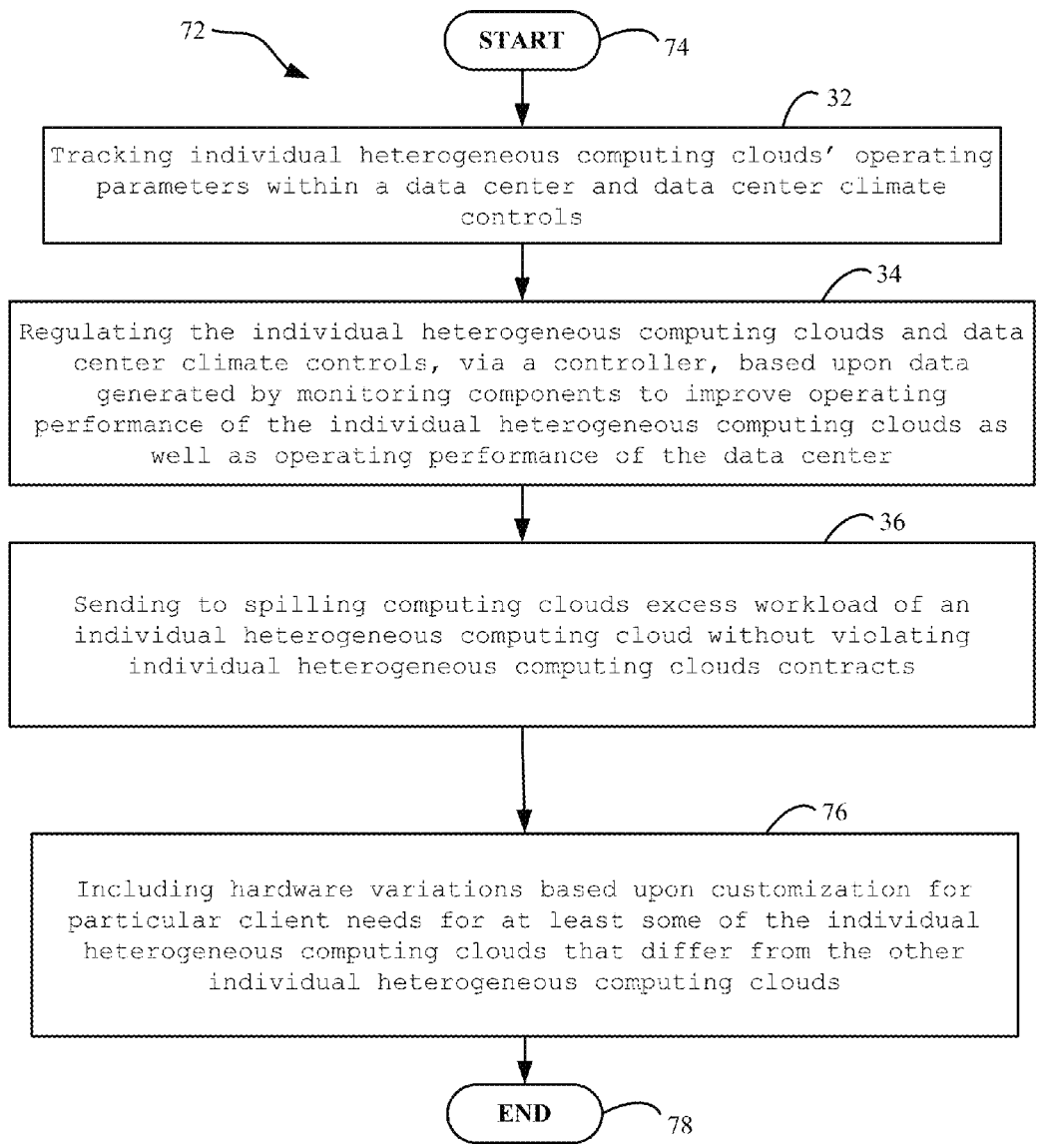
FIG. 7 is a flowchart illustrating method aspects according to the method of FIG. 2.

In another method embodiment, which is now described with reference to flowchart 72 of FIG. 7, the method begins at Block 74. The method may include the steps of FIG. 2 at Blocks 32, 34, and 36. The method may further comprise including hardware variations based upon customization for particular client needs for at least some of the individual heterogeneous computing clouds that differ from the other individual heterogeneous computing clouds at Block 76. The method ends at Block 78.

Another aspect of the invention is computer readable program codes coupled to tangible media to improve operation of a data center 12 with heterogeneous computing clouds 14a-14n and/or the heterogeneous computing clouds. The computer readable program codes may be configured to cause the program to track individual heterogeneous computing clouds' 14a-14n operating parameters within a data center 12 and data center climate controls 20. The computer readable program codes may also regulate the individual heterogeneous computing clouds 14a-14n and data center climate controls 20, via a controller 22, based upon data generated by monitoring components 18a-18n to improve operating performance of the individual heterogeneous computing clouds as well as operating performance of the data center 12. The computer readable program codes may further send to spilling computing clouds excess workload of an individual heterogeneous computing cloud without violating individual heterogeneous computing clouds contracts The computer readable program codes may further assign at least some of the individual heterogeneous computing clouds 14a-14n dedicated hardware that is assigned to one client 24a-24n only, and the individual heterogeneous computing clouds with dedicated hardware exhibit particular application profiles and/or particular temperature profiles that differ from other individual heterogeneous computing clouds in the same data center 12. The computer readable program codes may additionally activate the spilling computing clouds from bottom up, and the controller 22 regulates sharing of spilling computing clouds resources between other individual heterogeneous computing clouds.

The computer readable program codes may also activate the spilling computing cloud 26a-26n when a threshold based upon temperature, resource demand, and/or wear-out characteristics of individual heterogeneous computing cloud 14a-14n is expected to be exceeded. The computer readable program codes may further determine spilling computing cloud 26a-26n activation thresholds and/or data center 12 state thresholds.

In view of the foregoing, the system 10 provides improved operation of a data center 12 with heterogeneous computing clouds 14a-14n and/or the heterogeneous computing clouds. For example, data center cooling and associated maintenance costs constitute a significant percentage of the total running cost of data centers 12 according to recent studies. The uneven thermal profiles cause potential inefficiencies in the overall cooling infrastructure of a data center, e.g. data center 12. Currently however, all of the proposed techniques to address such are targeted towards homogeneous data centers.

Figure 8:
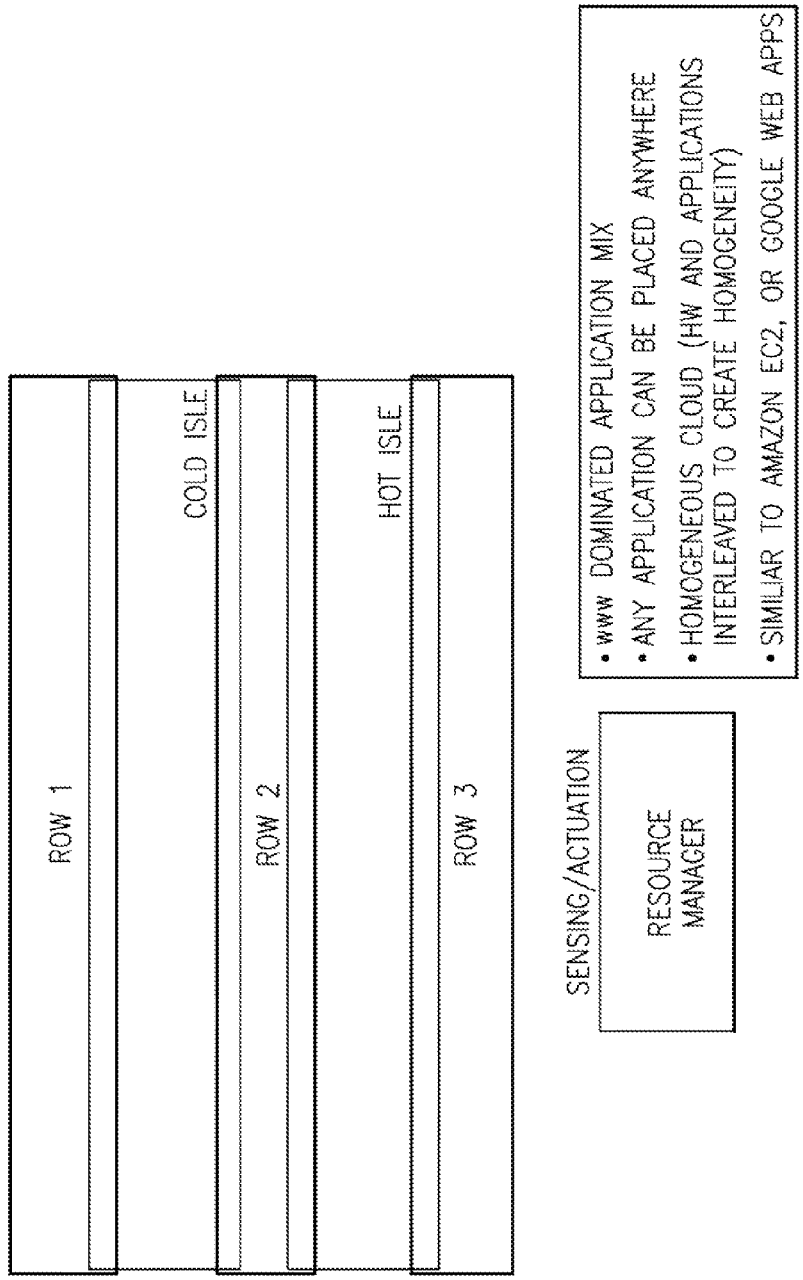
FIG. 8 is a block diagram illustrating a homogeneous prior art system.

With additional reference to FIG. 8, cloud computing is an emerging computing service that has been successfully implemented in World Wide Web ("WWW") applications by various vendors. Various hardware resources (usually at the granularity of individual servers) are contracted to clients 24a-24n in a cloud computing setting. Since the contracts are short term with no dedicated machine agreements, the data center management algorithms can migrate the workload from region to region in such settings. One reason for the foregoing is that the thermal variation is relatively small since the application mix has smaller variation.

Homogeneity in this context is in both hardware capabilities and application characteristics. An example for homogeneous cloud is AMAZON's™ E C2, where most computing resources are compatible and application profiles are dominated by WWW. In such settings, the data center profile is dominated by hot isles and cold isles with smaller variation among rack/towers.

With additional reference to FIGS. 9-15, heterogeneous computing clouds 14a-14n in a particular data center 12, e.g. data center, addresses dedicated hardware resources and/or longer term contracts to enterprise client-base, where the individual clients 24a-24n and/or corporations get significantly larger regions of the data center dedicated to their sole use for longer periods time. In general such arrangement can be defined as a collection of smaller and dedicated computing clouds 14a-14n, and where the hardware is also potentially customized to meet the needs of the client 24a-24n. For example, a collection of towers can be contracted to Corporation A for 12 months period, with a long-term service agreement.

The heterogeneity in this context exhibits itself in the different application mixes (and run-time behavior) associated with the dedicated clouds 14a-14n. The customization of hardware also creates differences among dedicated clouds 14a-14n, even if they were to run the same application mix. In an embodiment, system 10 focuses on the thermal management of heterogeneous computer clouds 14a-14n data centers 12.

In an embodiment, system 10 addresses dynamic thermal management and the unique challenges associated with heterogeneous computer clouds 14a-14n data centers 12. In one embodiment, when hardware in a dedicated cloud 14a-14n is assigned to a client 24a-24n, it is not possible to assign tasks from other clients to such resources because of the security restrictions.

In an embodiment, system 10 includes hardware variation where the resources for dedicated clouds 14a-14n are usually customized for the unique needs of the clients 24a-24n. For instance, the processing units (cores), memory hierarchy, and other resources can be significantly different among dedicated clouds 14a-14n.

In an embodiment, system 10 addresses temperature and/or application variation. Since the dedicated clouds 14a-14n are assigned to individual clients 24a-24n and/or corporations, they exhibit unique application and temperature profiles. For example, a dedicated cloud 14a-14n for "Trading Cloud/Corporation A" exhibits different characteristics then "Accounting/Corporation B" applications running a separate dedicated cloud. Further, the run-time characteristics also show differences as opposed to the more uniform daily/hourly fluctuations in a WWW based homogenous cloud, e.g. AMAZON™ E C2, GOOGLE™ Web Cloud.

In an embodiment, the system 10 includes thermal spilling cloud (or cluster) 26a-26n where the dynamic fluctuations, and run-time optimization actions by the controller 12, e.g. data center management, is performed. In one embodiment, since it is not possible to do workload mitigation across dedicated clouds 14a-14n, the spilling clouds 26a-26n are used to move the excess workload without violating individual contracts.

In an embodiment, the system 10 provides directional thermal spilling. For instance, the thermal spilling cloud(s) 26a-26n is (are) activated as the peak temperature(s) of (a) private cloud(s) 14a-14n is expected to be exceeded in the next time slice (T+1). In one embodiment, the thermal spilling cloud 26a-26n can still have dedicated hardware pieces for security (dedicated racks/servers) that are generally turned off (and activated on an on-demand/need basis).

In an embodiment, the dedicated clouds 14a-14n are selected and activated based on their locations in the data center 12 (proximity to the Data center Air Conditioner ("CRAC") units) and associated thermal improvement can be expected. In one embodiment, the spilling clouds 26a-26n (if unassigned) are activated from the bottom up (to increase the energy efficiency).

In an embodiment, the spilling clouds 26a-26n can also be activated based on the wear-out characteristics of the hardware components. For instance, if the dedicated clouds 14a-14n are stressed beyond the specified levels/thresholds, the applications can be migrated from the dedicated clouds to spilling clouds 26a-26n.

In an embodiment, the data center level management algorithm of the controller 22 hierarchically interacts with the private cloud 14a-14n level management (within quality of service ("QoS") and/or agreement limitations), to achieve a higher efficiency mode within the private cloud, by migrations/throttling and similar techniques. The expected outcome is reported to the controller 22, e.g. data center-level management, for global state prediction and thermal spilling cloud 26a-26n activation.

In an embodiment, system 10 provides private cloud 14a-14n based temperature modeling and/or management. In one embodiment, the system 10 does not model the temperature characteristics at server/rack or isle level as in the traditional approach, but at private cloud 14a-14n level even though the private clouds are not of equal size. Such partitioning gives optimal profiling opportunities for the thermal modeling algorithms. Thermal management algorithms (such as homogeneous options) can be implemented within the private cloud 14a-14n itself, where tasks can be directed/migrated according to optimization goals. Afterwards, the resulting predictions of power demand, temperature, network demand, and/or the like are reported to the controller 22, e.g. global management.

In an embodiment, the system 10 provides private cloud 14a-14n based profiling. For instance, private clouds 14a-14n are assigned global modes of operation with different management objectives characterized by the overall mix of application characteristics, power dissipation, temperature profile, input/output profile, network utilization, and/or the like. In one embodiment, the individual applications are not profiled (so are the individual servers/racks). This higher-level of abstraction at client-level provides much more efficient profiling of the characteristics. Similarly, the applications are profiled with respect to modes.

In an embodiment, the system 10 provides thermal budget borrowing and/or inter-cloud spilling. For instance, depending on the service and security agreements, the controller 22 e.g. global resource management infrastructure, of the data center 12 can enable resource borrowing as well as power and/or temperature borrowing among individual clouds 14a-14n. In one embodiment, this stage is done in coordination with the thermal spilling cloud 26a-26n activation.

In an embodiment, the system 10 is composed of hardware/software monitoring components 18a-18n and/or controller 22 for a heterogeneous computing cloud 14a-14n data center 12. In one embodiment, the monitoring components 18a-18n include power sensors that track the total power usage in the private cloud 14a-14n, temperature sensors for each private cloud region, reliability sensors that track the wear-out characteristics of individual pieces, and/or the like.

In an embodiment, the system 10 provides data center 12 management. In one embodiment, system 10 uses a hardware and/or software approach.

In an embodiment, the system 10 tracks the performance, power dissipation, thermal characteristics, reliability, and/or the like profiles for dedicated and/or private computing clouds 14a-14n. In one embodiment, system 10 assigns mode of operation for the computation profile where such profiles can be specified by the clients 24a-24n and/or can be formed through run-time learning techniques.

In an embodiment, the system 10 uses the mode of operation and the next state is predicted for each private cloud 14a-14n. This state prediction incorporates the global characteristics of the data center 12 such as topology, proximity to the CRAC units, and/or the like as well as individual characteristics of the private cloud 14a-14n. In one embodiment, even the private cloud 14a-14n constitutes a variable part of the data center 12, and the partitioning is done at functional level and not at physical/thermal node level.

In an embodiment, the system 10 uses customized mitigation algorithms that can be implemented within the private clouds 14a-14n. In one embodiment, such can be specified by the QoS with client 14a-14n.

In an embodiment, the system 10 provides thermal spilling clouds 26a-26n, which comprise regions of dedicated or not dedicated hardware with greater management flexibility. In one embodiment, applications can be migrated in order to meet the QoS and security agreements, as well as maximum efficiency goals.

In an embodiment, the spilling clouds 26a-26n can be implemented in various ways. For instance, scattered tower/regions in proximity of the main private cloud 14a-14n, unified spilling cloud 26a-26n (close to CRAC) with dedicated racks for individual clients 24a-24n, and/or the like.

In an embodiment, the system 10 provides thermal budget borrowing and/or cross cloud spilling. For instance, depending on the service and security agreements, the controller 22 handling global resource management can enable resource and thermal budget borrowing across private clouds 14a-14n. For example, applications from a private cloud 14a-14n can spill to another private cloud if the security agreements enable such mode.

In an embodiment, private cloud 14a-14n level characterization and/or profiling uses the most meaningful patterns and/or estimates for each cluster (enterprise/bank, WWW, video has unique characteristics, patterns, and/or the like). Such enables accurate thermal predictions and efficient task placement. Also, such generates benchmarks for each cluster, and benchmarks are used in predicting the next stage.

In an embodiment, the system 10 uses temperature estimations based on private clouds 14a-14n. For instance, cluster based history tables, current state, CRAC and topology information, and/or the like are used in predicting the temperature at the next time_point. In one embodiment, for each cluster, state information is kept and used to predict the next step. In one embodiment, there is a branch-like decision process in directing incoming computation based on data center's 12 history tables.

In an embodiment, system 10 provides thermal spilling at tower/cluster level using a bottom up flow from intra/inter cloud. In one embodiment, the spilling clusters 26a-26n and/or clouds are used. For instance, when the dedicated clusters Temp_estimates exceed thresholds, spilling clusters are utilized.

In an embodiment, the spilling starts from the bottom rack to top in order to increase thermal efficiency (can have dedicated regions/racks for clients 24a-24n). In one embodiment, system 10 provides additional homogeneous clusters for spilling during hotspots. For example, there can be reduced utilization of Enterprise Group A cluster by 30% with spilling to a homogeneous region on demand.

In an embodiment, the system 10 provides resource sharing and spilling across clouds 14a-14n (based on the service and security agreements). In one embodiment, resource/budget borrowing across private clouds 14a-14n (borrowing thermal budget, power budget, and/or the like) by coordination of the controller 22, e.g. the global resource manager.

Figure 9:
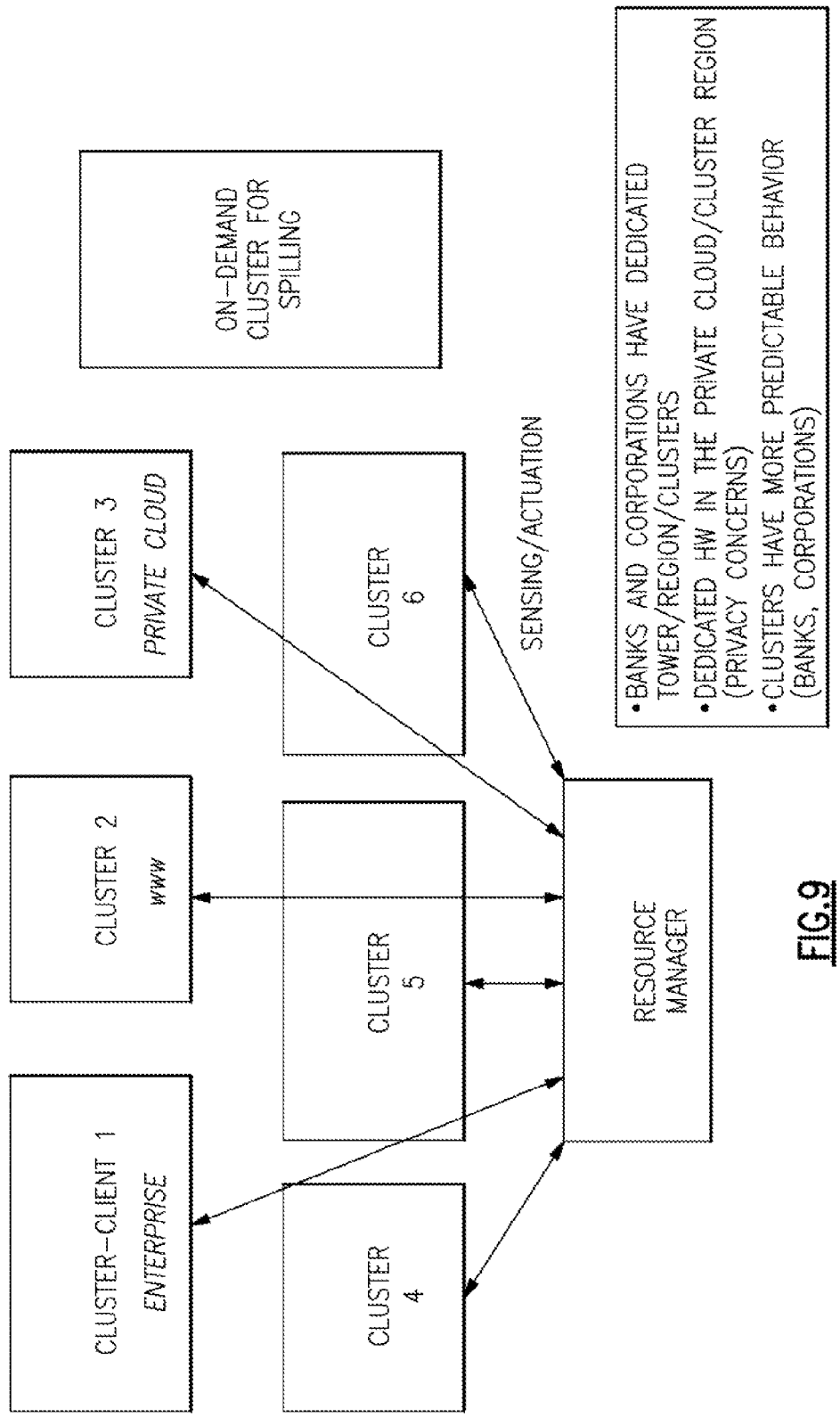
FIG. 9 is a block diagram of a heterogeneous private cloud (Enterprise oriented) in accordance with the invention.
Figure 10:
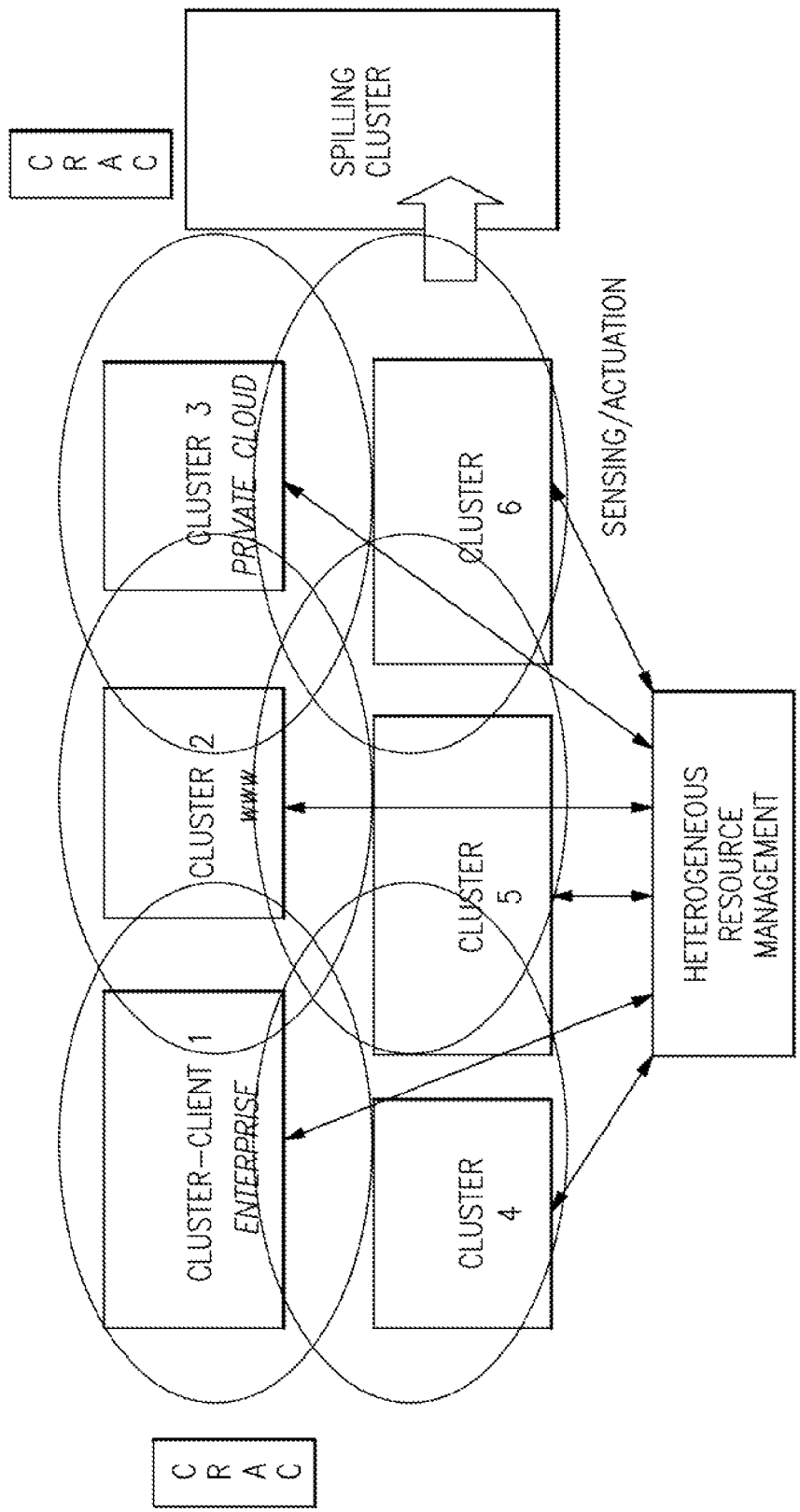
FIG. 10 is a block diagram of a thermal management at cluster-level in accordance with the invention.
Figure 11:
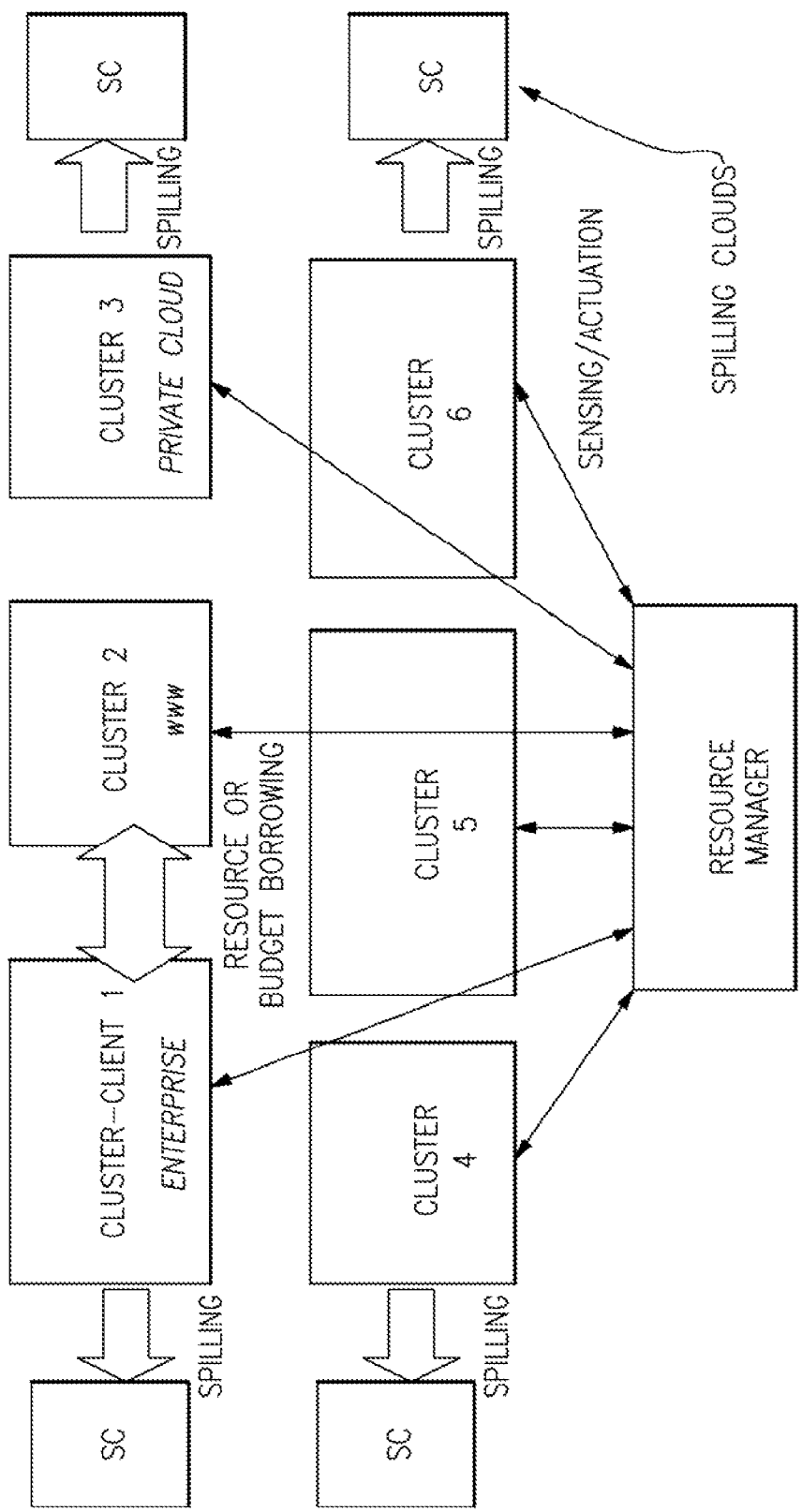
FIG. 11 is a block diagram of distributed spilling clouds in accordance with the invention.

With reference to FIG. 9, daily/weekly demand still fluctuates and therefore balancing dedicated/shared hardware while increasing efficiency may be the goal. For instance, there is a need for intelligent management to meet enterprise demands of private clouds 14a-14n and/or energy efficiency goals.

Figure 12:
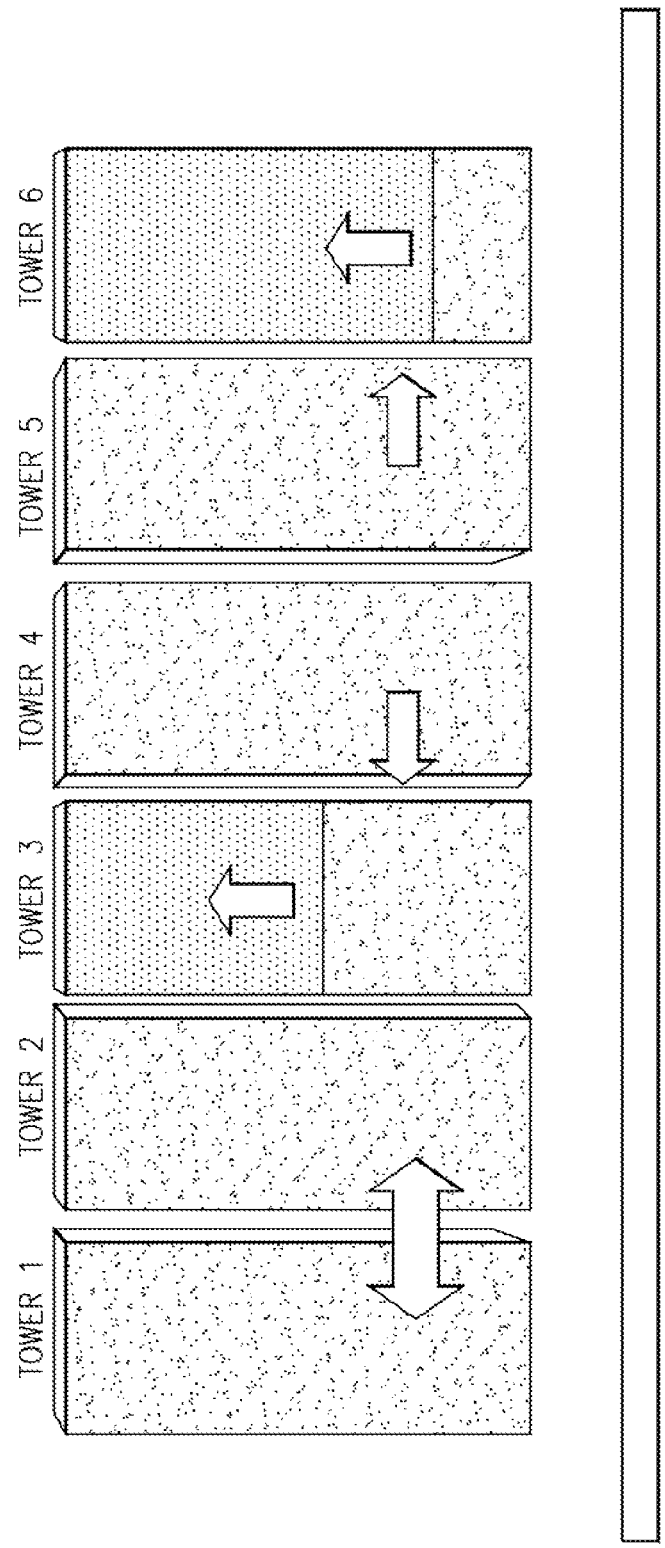
FIG. 12 is a block diagram of thermal spilling at the tower/cluster-level in accordance with the invention.
Figure 13:
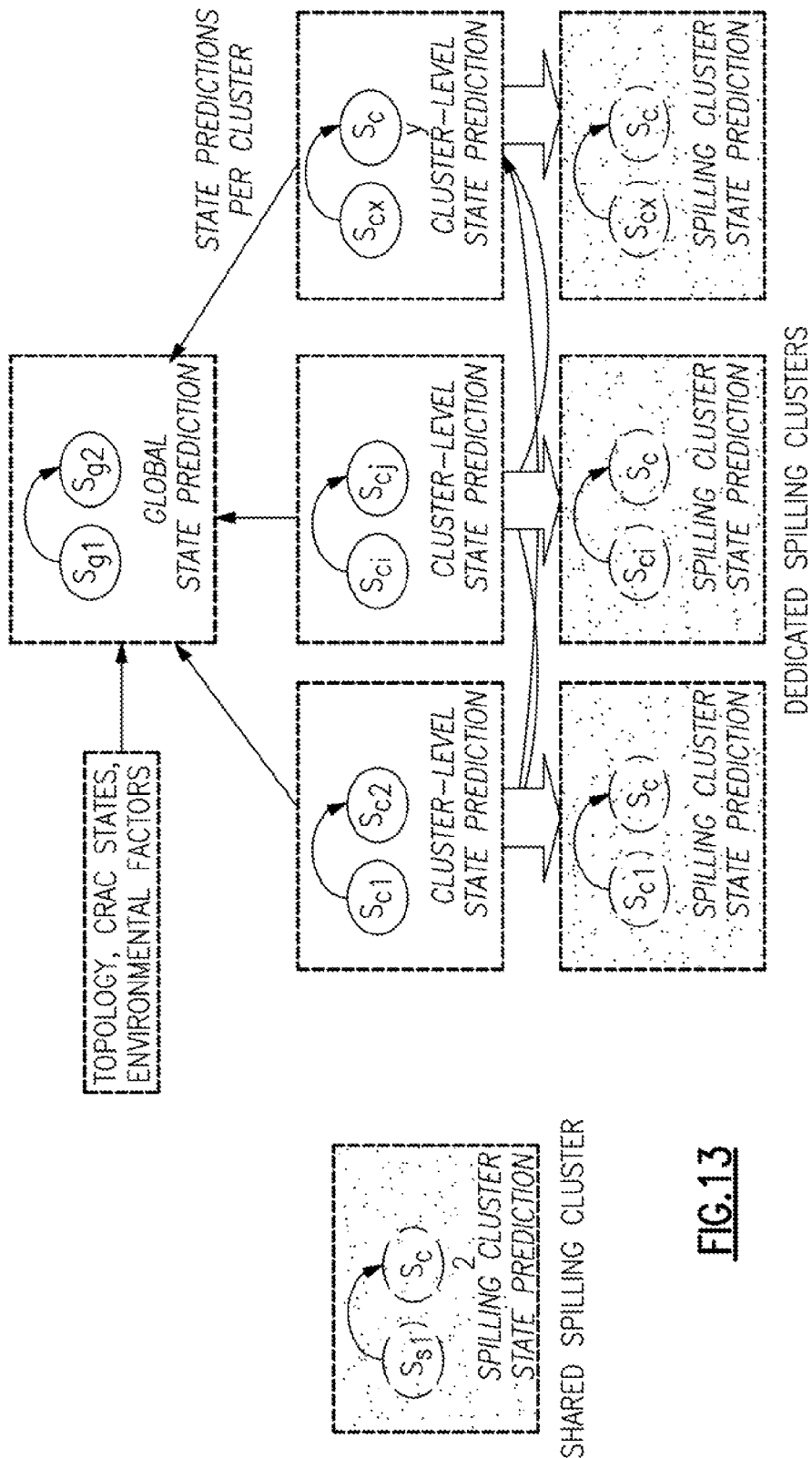
FIG. 13 is a block diagram of thermal management in accordance with the invention.
Figure 14:
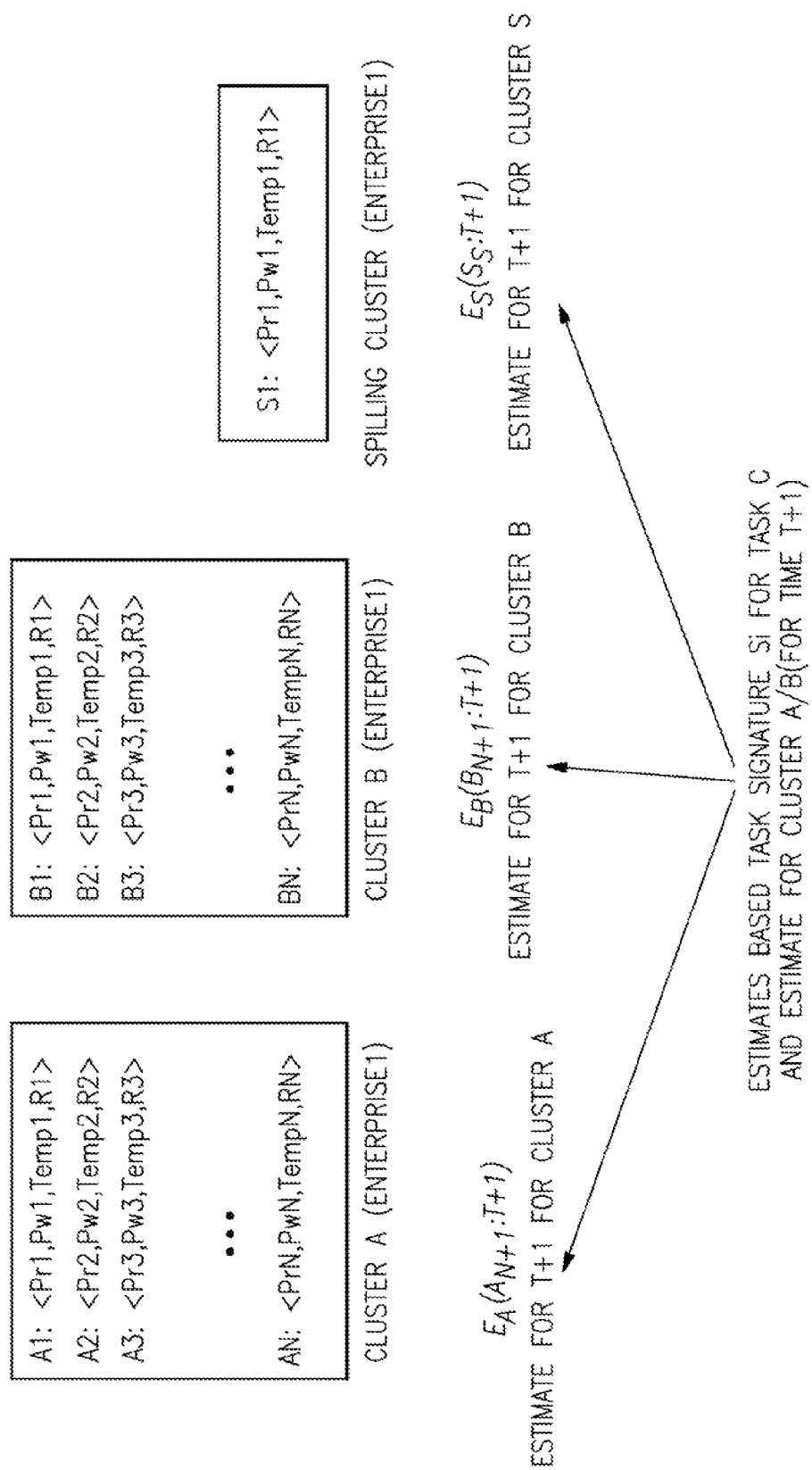
FIG. 14 is a block diagram of an exemplary approach in accordance with the invention.
Figure 15:
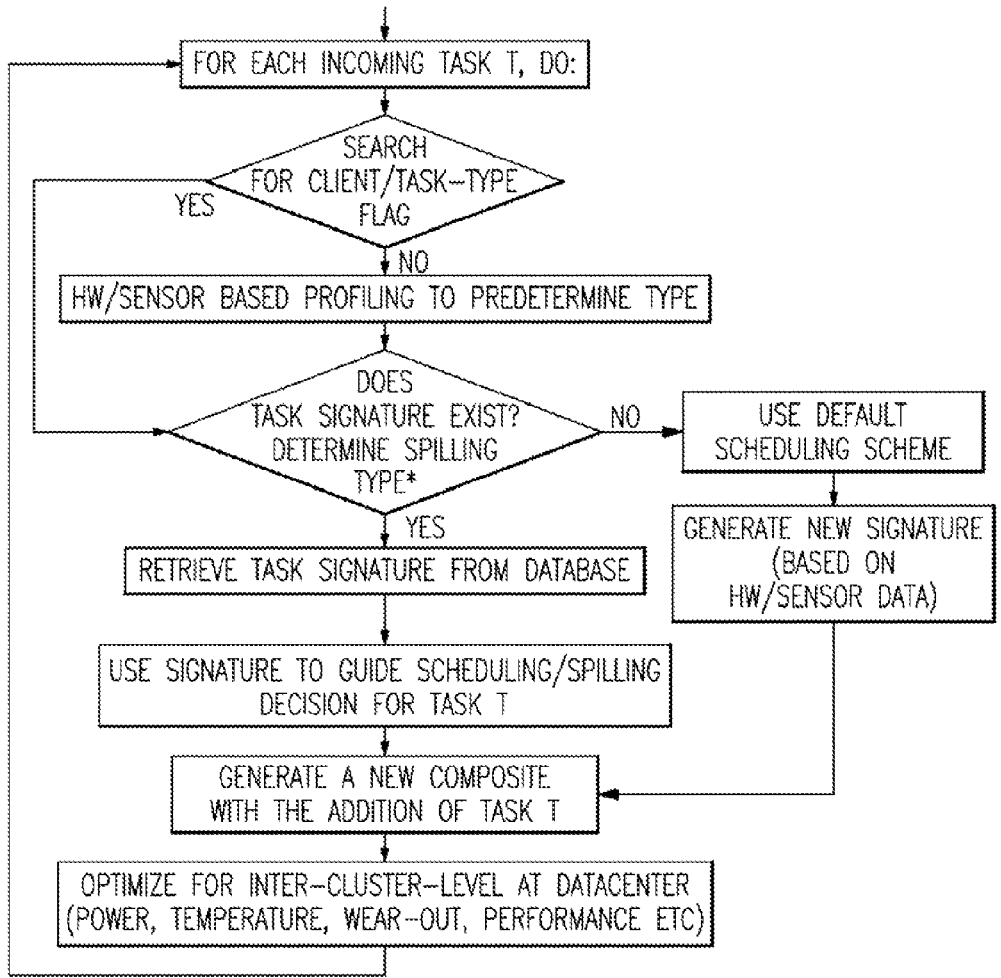
FIG. 15 is a flowchart illustrating method aspects according to the invention.

With reference to FIG. 12, in an embodiment, a simplified case of thermal spilling is described that reduces hotspot region density. In one embodiment, system 10 checks hotspot temperature and if still higher than Tth continue. In one embodiment, there is spilling to dedicated towers starting with the bottom racks. In an embodiment, there is a check of region temperature and if Tpeak>TTh2, then continue spilling (after iteration K: start throttling). In one embodiment, system 10 includes resource/budget borrowing (between towers 1 and 2 in this example). In one embodiment, the computer program product of claim 16 coordinates bottom-up activation of spilling hardware in the dedicated regions (described in FIG. 12).

In an embodiment, an enterprise-oriented cloud with dedicated/private clusters 14a-14n (or towers/regions) are assigned in system 10. In one embodiment, resource characteristics, e.g. tower hardware, location, proximity to CRAC, and/or the like, is determined for the heterogeneous data center 12. In addition, available spilling clusters 26a-26n and their characteristics are determined.

In an embodiment, system 10 profiles each private cloud 14a-14n mode (cumulative workload running on a server) as a signature for the customer and/or application, which can be provided by the client 24a-24n or through run-time profiling.

In an embodiment, system 10 provides private cloud 14a-14n pattern/mode quantified by performance, power, temperature, and/or the like. For instance, Bank1 comprises an accounting dominated mix including batch processing, moderate power, low temperature, and/or the like. Bank2 comprises an operations dominated mix including batch processing, high-power, optimization-driven compute bursts, and/or the like. Corp1 comprises trading processing including interactive, high-power, high-temperature, bursts, and/or the like. Bank3 comprises automated teller machine processing including interactive, low-power, moderate temperature, parallel, and/or the like.

Airline1 comprises processing including interactive, high-power/temperature, and/or the like.

In an embodiment, system 10 stores cluster enterprise signatures for individual task-types (as well as composites) over time. In one embodiment, system 10 provides task-type decision based on customer specs for the task and run-time profiling (hardware counters/sensors).

In an embodiment, system 10 decides on resource assignment for incoming task T based on a corresponding task signature and existing resource assignment information. In one embodiment, system 10 estimates temperature profiles for all regions in the data center 12 and determines if potential hotspots exist.

In an embodiment, system 10 calculates competitive action needed for next time interval. In one embodiment, system 10 provides resource/budget borrowing among private clouds 14a-14n (and public clouds).

In an embodiment, system 10 provides spilling cloud 26a-26n assignment and migration. In one embodiment, system 10 provides redistribution/assignment within private cloud 14a-14n.

In an embodiment, system 10 breaks down the application workload behavior at cluster/server-level with application behavior in mind instead of the data center as a whole, where fine-grain hashing hides all meaningful pattern/application behavior from the resource manager, and therefore efficient prediction is almost impossible at that bulk scale. In one embodiment, the system 10 uses dedicated storage and computation unit to collect vast amounts of server/cluster/application data at the data center 12 level and post process it to correlate with other application characteristics.

In an embodiment, the system 10 generates basic application profiles to be used to estimate behavior of incoming computation. In one embodiment, the number of "Application Stereotypes" is generated with system 10 by isolating their individual characteristics.

In an embodiment, the system 10 generates data center 12 maps that include all imperfections about cooling facilities, inherent tendencies of the data center heating, topology information for the data center, sensor data from server/rack/cluster level, and/or the like. In one embodiment, system 10 estimates the next state of the data center 12 based on the history information, current state of the data center, and by leveraging intelligent prediction algorithms that also leverage external data to be fed into the system, such as major sporting event to start in an hour, and/or the like.

In an embodiment, system 10 prevents hotspot behavior before it happens by predicting the temperature in incremental time units. In one embodiment, system 10 plans for power overloads and other major complications as well as resource allocation for the existing clusters in the data center 12. For instance, if an enterprise cluster is expected to increase the computational demand, and WWW clusters aren't, the controller 22, e.g. resource manager, can effectively direct resources for such a case.

In an embodiment, system 10 incorporates controllers per individual heterogeneous cloud that coordinates the computation among the heterogeneous cloud resources and the spilling resources. The distributed controller per heterogeneous cloud uses detailed application behavior, power dissipation information for spilling decisions. The distributed cloud controller interacts with the global controller according to the client contracts, revealing information guided by the security specifications.

In an embodiment, system 10 predicts incoming computation behavior by scanning the database for the past application/server/cluster-level data. For instance, based on the application profiles that are acquired by scanning vast amounts of history data from server/rack/cluster level for different applications.

In an embodiment, system 10 directs incoming computation such that it is compatible with the estimated next state of the data center 12 (in terms of power usage, utilization, temperature/hotspot behavior, reliability profile, and/or the like) such that the overall system efficiency is improved. For instance, depending on the estimated power/thermal/resource utilization profile for the incoming application based on the fundamental application stereotypes generated by sorting/analyzing past/history databases.

In an embodiment, the thermal spilling at the cluster and tower level starts with the lower racks—reduce density. In one embodiment, system 10 iteratively starts spilling to neighbor homogeneous clusters and towers. In one embodiment, system 10 continues the process until the thermal emergency threshold is reached.

Heterogeneous computing cloud implies that regions of computing resources are dedicated to different enterprise clients with different hardware or operation characteristics. While system 10 can be applicable in different settings, it targets the challenges in a heterogeneous enterprise cloud.

In one embodiment, due to the special dedicated hardware and security requirements in an enterprise computing environment, the algorithm of system 10 specifically focuses on a case where no task migration is possible within active dedicated regions.

In one embodiment, system 10 incorporates 3 new pieces to enable enterprise spilling. System 10 treats each enterprise as an application (with a special footprint) and provides a spilling based management technique. Since there is no migration among dedicated regions due to security issues, the technique spills to dedicated resources. And lastly, system 10 estimates two versions of the next state in terms of temperature, performance, wear-out, power with and without spilling. System 10 focuses on state predictions and management that are spilling-aware.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a data center;
    monitoring components to track individual heterogeneous computing clouds' operating parameters within the data center, the data center operating parameters, and data center climate controls;
    a dedicated controller per individual heterogeneous computing cloud that regulates the individual heterogeneous computing clouds and data center climate controls based upon data generated by the monitoring components to improve operating performance of the individual heterogeneous computing clouds as well as operating performance of the data center; and
    spilling computing clouds to receive workload of an individual heterogeneous computing cloud without violating individual heterogeneous computing clouds contracts when a temperature threshold of the hardware is expected to be exceeded by activating computing cloud hardware from bottom up of racks.

2. The system of claim 1 wherein at least some of the individual heterogeneous computing clouds include dedicated hardware that is assigned to one client only.

3. The system of claim 2 wherein the individual heterogeneous computing clouds with dedicated hardware exhibit at least one of particular composite application profiles and particular temperature profiles that differ from other individual heterogeneous computing clouds in the same data center.

4. The system of claim 1 wherein the spilling computing clouds activate when a threshold based upon at least one of resource demand, and wear-out characteristics of the hardware is expected to be exceeded.

5. The system of claim 1 wherein the controller models at least one of the individual heterogeneous computing clouds and the data center to determine at least one of spilling computing cloud activation thresholds and data center state thresholds.

6. The system of claim 1 wherein the controller regulates sharing of spilling computing clouds resources between individual heterogeneous computing clouds.

7. The system of claim 1 wherein at least some of the individual heterogeneous computing clouds include hardware variations from the other individual heterogeneous computing clouds.

8. The system of claim 7 wherein the hardware variations are based upon customization for particular client needs.

9. A method comprising:
    tracking individual heterogeneous computing clouds' operating parameters within a data center, the data center operating parameters, and data center climate controls; and
    regulating the individual heterogeneous computing clouds and data center climate controls, via a controller, based upon data generated by monitoring components to improve operating performance of the individual heterogeneous computing clouds as well as operating performance of the data center;
    spilling computing clouds workload of an individual heterogeneous computing cloud without violating individual heterogeneous computing clouds contracts when a temperature threshold of the hardware is expected to be exceeded; and
    activating computing cloud hardware belonging to the spilling computing clouds from bottom up of racks.

10. The method of claim 9 further comprising assigning at least some of the individual heterogeneous computing clouds dedicated hardware that is assigned to one client only, and the individual heterogeneous computing clouds with dedicated hardware exhibit at least one of particular application profiles and particular temperature profiles that differ from other individual heterogeneous computing clouds in the same data center.

11. The method of claim 9 wherein the controller regulates sharing of spilling computing clouds resources between other individual heterogeneous computing clouds.

12. The method of claim 11 further comprising activating the spilling computing cloud when a threshold based upon at least one of resource demand, and wear-out characteristics of individual heterogeneous computing cloud is expected to be exceeded.

13. The method of claim 9 further comprising determining at least one of spilling computing cloud activation thresholds and data center state thresholds.

14. The method of claim 9 further comprising including hardware variations based upon customization for particular client needs for at least some of the individual heterogeneous computing clouds that differ from the other individual heterogeneous computing clouds.

15. A computer program product embodied in a non-transitory computer usable medium comprising:
    computer readable program codes coupled to the non-transitory computer usable medium to improve operation of a data center with heterogeneous computing clouds, the computer readable program codes configured to cause the program to:

track individual heterogeneous computing clouds' operating parameters within a data center, the data center operating parameters, and data center climate controls;

regulate the individual heterogeneous computing clouds and data center climate controls, via a controller, based upon data generated by monitoring components to improve operating performance of the individual heterogeneous computing clouds as well as operating performance of the data center;

send to spilling computing clouds excess workload of an individual heterogeneous computing cloud without violating individual heterogeneous computing clouds contracts when a temperature threshold of the hardware is expected to be exceeded; and activate computing cloud hardware belonging to the spilling computing clouds from bottom up of racks.

16. The computer program product of claim 15 further comprising program code configured to: assign at least some of the individual heterogeneous computing clouds dedicated hardware that is assigned to one client only, and the individual heterogeneous computing clouds with dedicated hardware exhibit at least one of particular application profiles and particular temperature profiles that differ from other individual heterogeneous computing clouds in the same data center.

17. The computer program product of claim 15 wherein the controller regulates sharing of spilling computing clouds resources between other individual heterogeneous computing clouds.

18. The computer program product of claim 15 further comprising program code configured to: activate the spilling computing cloud when a threshold based upon at least one of resource demand, and wear-out characteristics of individual heterogeneous computing cloud is expected to be exceeded.

19. The computer program product of claim 15 further comprising program code configured to: determine at least one of spilling computing cloud activation thresholds and data center state thresholds.

* * * * *